US 6,729,053 B2

(12) United States Patent
Castro

(10) Patent No.: US 6,729,053 B2
(45) Date of Patent: May 4, 2004

(54) BRACKET FOR MOUNTING A LICENSE PLATE TO A VEHICLE

(75) Inventor: James Castro, Ann Arbor, MI (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 0 days.

(21) Appl. No.: 10/124,027

(22) Filed: Apr. 17, 2002

(65) Prior Publication Data

US 2003/0196355 A1 Oct. 23, 2003

(51) Int. Cl.[7] .............................. G09F 7/00; G09F 3/16
(52) U.S. Cl. ........................................... 40/209; 40/666
(58) Field of Search ..................... 40/200, 209, 591, 40/666; D20/13, 14; 248/220.21

(56) References Cited

U.S. PATENT DOCUMENTS

| 1,886,352 A | * | 11/1932 | Nickerson, Jr. ............... 40/209 |
| 1,898,024 A | * | 2/1933 | Von Hacht ................... 40/209 |
| 2,494,179 A | * | 1/1950 | King ........................... 40/591 |
| 3,509,653 A | * | 5/1970 | Hummel ....................... 40/591 |
| 3,702,510 A | * | 11/1972 | Genyk et al. ................. 40/209 |
| 4,170,838 A | * | 10/1979 | Bott ............................ 40/209 |
| 4,302,896 A | * | 12/1981 | Bott ............................ 40/209 |
| 4,736,539 A | * | 4/1988 | Dickinson ................... 40/591 |
| 4,924,611 A | * | 5/1990 | Shaw ........................... 40/210 |
| 4,970,809 A | * | 11/1990 | Bushbaum ................... 40/209 |
| 5,027,537 A | * | 7/1991 | Freeman et al. .............. 40/210 |
| 5,813,640 A | * | 9/1998 | Koch et al. ............. 248/222.11 |
| 6,167,645 B1 | * | 1/2001 | Gasko et al. ................. 40/200 |

* cited by examiner

Primary Examiner—Brian K. Green
(74) Attorney, Agent, or Firm—Gifford, Krass, Groh, Sprinkle, Anderson & Citkowski, P.C.

(57) ABSTRACT

A bracket for mounting a license plate to a vehicle having an air scoop in the bumper area. The bracket has a body having a mounting surface adapted to receive a license plate, an arm having a hook which extends from a rear surface of the body. The hook engages a flange defining the air scoop. A pair of threaded fasteners pass freely through the license plate, body of the brackets to be received in threaded apertures in the vehicle.

9 Claims, 3 Drawing Sheets

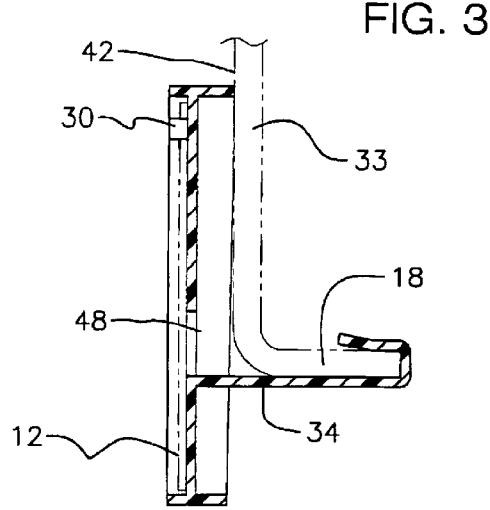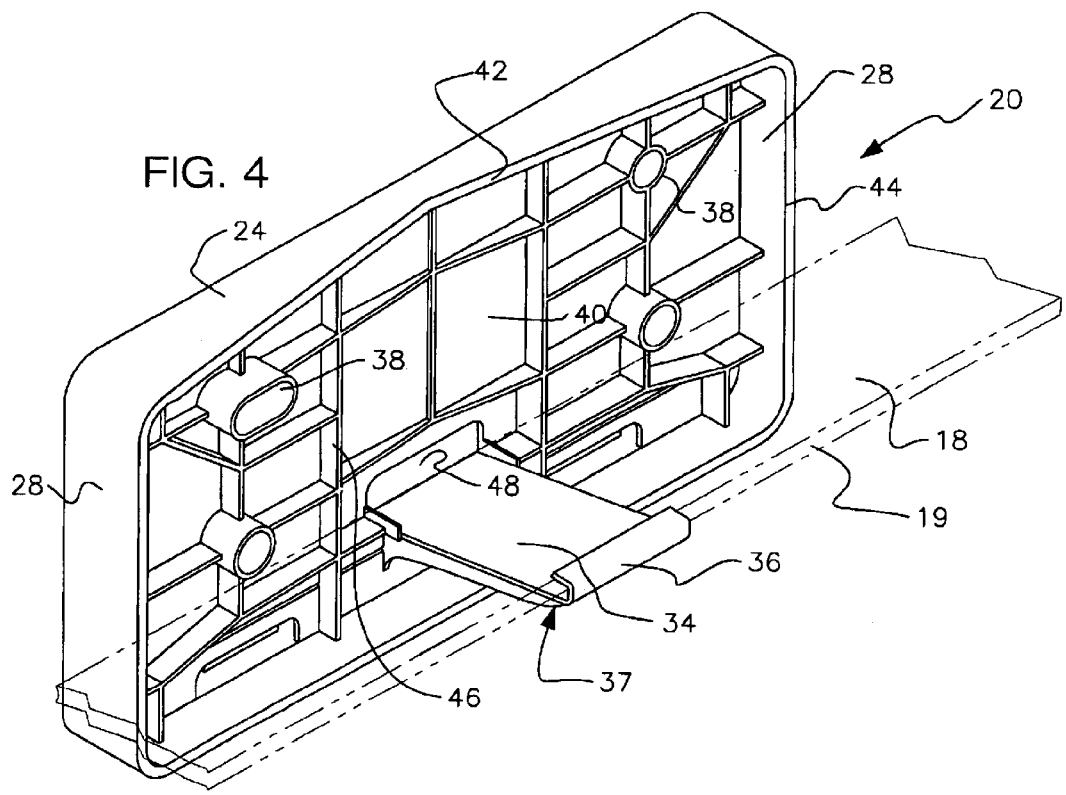

BRACKET FOR MOUNTING A LICENSE PLATE TO A VEHICLE

FIELD OF THE INVENTION

The invention relates to a bracket for mounting a license plate to a vehicle.

BACKGROUND OF THE INVENTION

Brackets for mounting license plates to vehicles are typically stamped from metal or molded from a composite material and bolted to the vehicle. However, attachment of brackets to vehicles having curved profiles and/or openings for air scoops is difficult. In such cases, the bracket is mounted tangentially to a rounded portion of the vehicle. When air scoops are present in the front bumper, it is difficult to securely bolt the bracket to the vehicle. Frequently, the side edges of the bracket and license plate are unattached to the vehicle. When the vehicle passes through carwashes, the brushes of the carwash sometimes damage the license plate or bracket when passing over the license plate and bracket. Accordingly, it would be desirable to provide a license plate bracket which is easily assembled, easily mounted to the vehicle, and which provides a stable platform for the license plate to prevent damage to the plate and bracket.

SUMMARY OF THE INVENTION

The invention relates to a bracket for mounting a license plate to a vehicle, particularly a vehicle of the type having an air scoop adjacent or as part of the bumper. The bracket includes a body having a top, a bottom and a pair of side edges. A planar mounting surface extends across a front of the body. An arm with a hook extends from the center of the rear surface of the body. The hook extends upwardly to engage a flange defining the air scoop. The rear edges of the bracket are shaped to conform with the corresponding shape of the vehicle. In this manner, a license plate and license plate bracket may be mounted quickly with the use of only two license plate screws.

BRIEF DESCRIPTION OF THE DRAWING

The present invention will be more fully understood by reference to the following detailed description when read in conjunction with the accompanying drawings in which the reference characters refer to like parts throughout the several views and in which:

FIG. 3 is a sectional side view of the bracket taken through lines 3—3 of FIG. 2;

FIG. 4 is a rear perspective view of the bracket as installed on a portion of a flange in accordance with the invention.

DETAILED DESCRIPTION OF THE PREFERRED EMBODIMENTS

Figure 1:
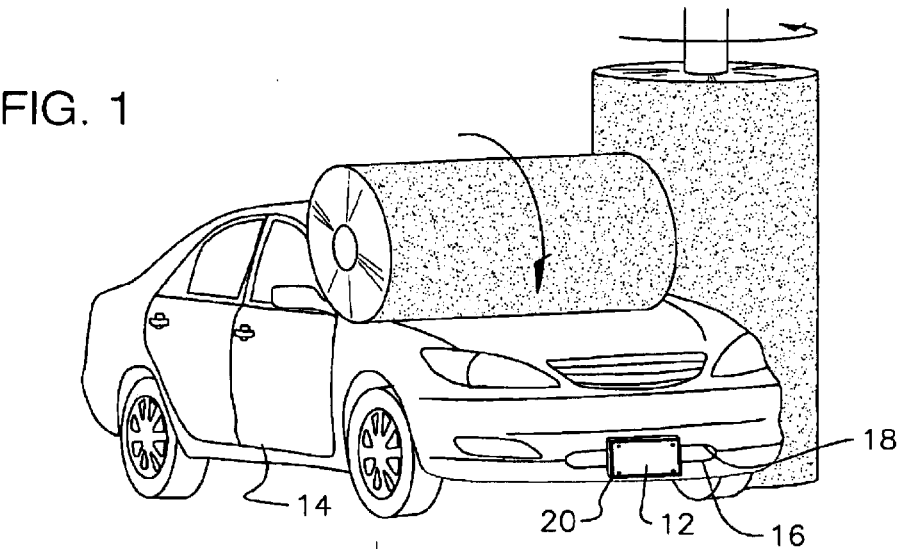
FIG. 1 is a perspective view of the bracket shown mounted to a vehicle as it passes through a carwash.
Figure 2:
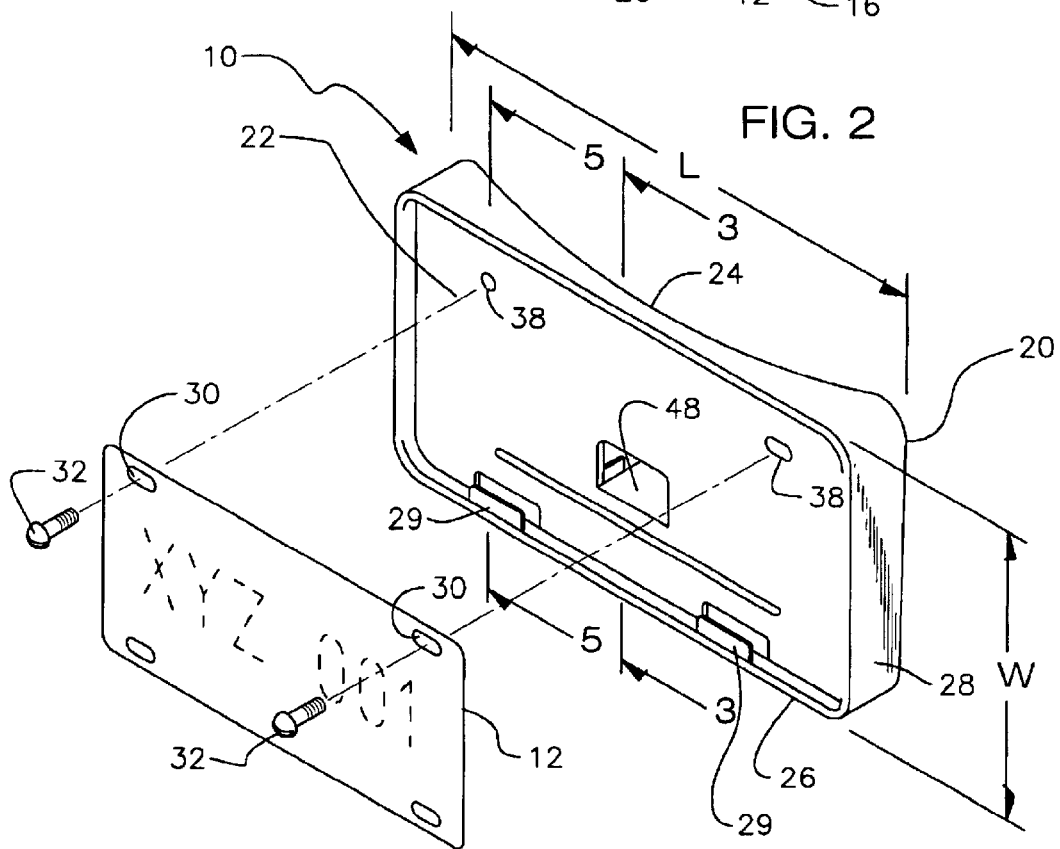
FIG. 2 is an exploded front perspective view of the bracket and license plate in accordance with the invention.

A bracket 10 shown for mounting a license plate 12 to a vehicle 14 having an air scoop 16 in accordance with the invention is shown in FIGS. 1 and 2. The air scoop 16 has an opening defined by a flange 18 which extends inwardly into the vehicle 14 as shown in FIGS. 3 and 4.

Figure 5:
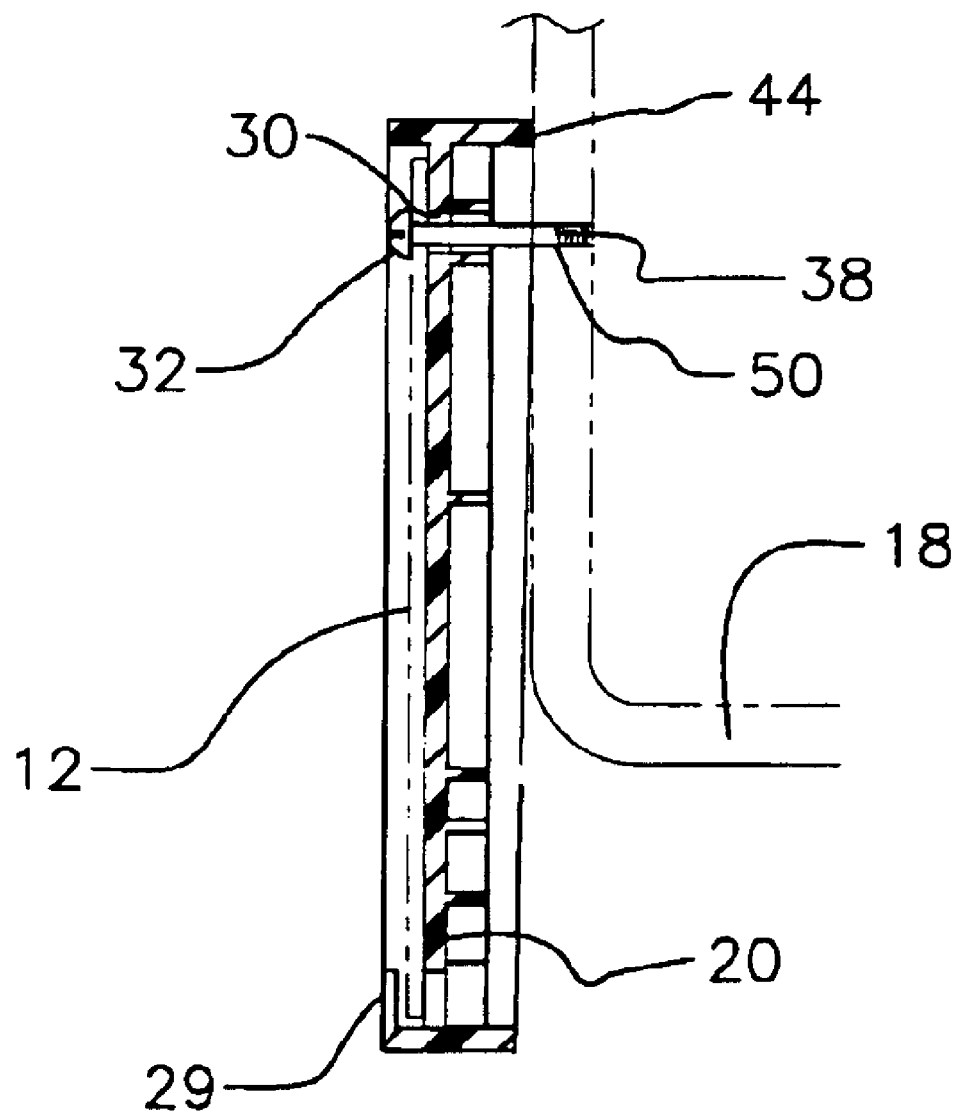
FIG. 5 is a sectional side view of the bracket showing the bracket mounted in place on the vehicle in accordance with the invention.

As best shown in FIG. 2, the bracket 10 includes an elongated body 20. The body 20 has a front planar mounting surface 22 defined by a top 24, bottom 26 and pair of sides 28 as shown in FIG. 2. The mounting surface 22 has a width "W" between the top 24 and bottom 26 which is equal or greater than the width of the license plate 12. Likewise, the mounting surface 22 has a length "L" which is equal or greater than the length of the license plate 12. A pair of tabs 29 extend upwardly from the bottom of the mounting surface 22 to receive the license plate 12. Mounting bolts 32 are to extend through apertures 30 in the bracket and be received in threaded bores 50 formed in the vehicle as best shown in FIG. 5.

As shown in FIG. 3, an arm 34 having a hook 36 extends from a rear surface 40 of the body. The arm 34 is positioned midway from each side 28 approximately one-third of the width from the bottom 26. The hook 36 has an engagement portion 37 that opens upwardly to engage a first edge 19 of flange 18 defining the air scoop 16 as shown in FIGS. 3 and 4. The top has a second edge 42 formed to correspond to the shape of the vehicle where the second edge 42 is mounted. Thus, the second edge 42 has a curved contour which mirrors the shape of the vehicle where the second edge rests when mounted. Likewise, each of the sides 28 has an edge surface 44 which corresponds with the shape of the vehicle. The body 20 has a lattice 46 of projections extending from the rear surface 40 to provide strength and rigidity to the body 20. The aperture 48 is formed through the body 20 adjacent the arm to facilitate viewing of the flange during installation. Thus, the bracket 10 is easily mounted to the vehicle by inserting the arm 34 into the scoop 16 and slipping the hook 36 over a first edge of the flange 18. The mounting bolts 32 are inserted through the plate 12, apertures 30, 38 to be received in threaded bores 50 formed in the vehicle. The license plate and bracket are mounted with only two bolts 32. The edges of the pair of sides 28 and the edge of the top 24 rest on the vehicle surface so that the bracket and plate are securely held in place with no appendices which can be caught by carwash brushes.

Having described my invention, many other modifications may be apparent to those skilled in the art to which it pertains without deviation from the spirit of the invention as defined by the scope of the appended claims.

I claim:

1. A bracket assembly for mounting a license plate to a vehicle, said bracket assembly comprising:

a body having a front surface and a rear surface extending between a pair of sides, said front surface having a planar portion adapted for mounting said license plate thereto, said rear surface having an arm disposed centrally between said pair of sides, said arm extending outwardly from said rear surface, said arm having a hook adapted to engage a portion of said vehicle; and a pair of fasteners, each of said fasteners passing through one of a pair of apertures in said license plate to be received in threaded apertures in said vehicle.

2. The bracket assembly of claim 1 having a top having a second edge, said second edge having a contour complimentary with a shape of said vehicle where said second edge abuts said vehicle.

3. The bracket assembly of claim 1, wherein said planar portion of said front surface extends a predetermined width between a top and a bottom, said width being at least equal to a width of said license plate.

4. The bracket assembly of claim 3, wherein said arm extends from said body from a position generally one third of the distance from said bottom to said top.

5. The bracket assembly of claim 1, wherein said planar portion has a predetermined length extending between said pair of sides, said length being at least equal to a predetermined length of said license plate.

6. A bracket assembly for mounting a license plate to a vehicle having an air scoop flange, said bracket assembly comprising a body having a front surface and a rear surface extending between a pair of sides, said front surface having a planar portion adapted for mounting said license plate thereto, said rear surface having one arm disposed centrally between said pair of sides, said arm extending outwardly from said rear surface, said arm having a single hook extending under the air scoop flange, said hook having an engagement portion extending upwardly to engage the air scoop flange, said hook being adjacent to one of said pair of sides.

7. The bracket assembly of claim 6, wherein said planar portion of said front surface extends a predetermined width between a top and a bottom, said width being at least equal to a width of said license plate.

8. The bracket assembly of claim 6, wherein said planar portion has a predetermined length extending between said pair of sides, said length being at least equal to a predetermined length of said license plate.

9. The bracket assembly of claim 6, wherein said pair of aims side edges and said tab arm extend along a plane normal to said rear surface.

* * * * *

UNITED STATES PATENT AND TRADEMARK OFFICE
CERTIFICATE OF CORRECTION

PATENT NO. : 6,729,053 B2
DATED : May 4, 2004
INVENTOR(S) : James Castro

It is certified that error appears in the above-identified patent and that said Letters Patent is hereby corrected as shown below:

Column 4,
Line 13, after "pair of" delete "aims".
Line 13, before "arm extends" delete "tab".

Signed and Sealed this

Eighth Day of February, 2005

JON W. DUDAS
*Director of the United States Patent and Trademark Office*